United States Patent [19]
Shimosaka et al.

[11] Patent Number: 5,720,676
[45] Date of Patent: Feb. 24, 1998

[54] GOLF BALL

[75] Inventors: Hirotaka Shimosaka; Keisuke Ihara; Michio Inoue; Atuki Kasasima, all of Chichibu, Japan

[73] Assignee: Bridgestone Sports Co., Ltd., Tokyo, Japan

[21] Appl. No.: 680,841

[22] Filed: Jul. 16, 1996

[30] Foreign Application Priority Data

Jul. 25, 1995 [JP] Japan .................................. 7-209076

[51] Int. Cl.$^6$ .................................................. A63B 37/14
[52] U.S. Cl. .......................... 473/384; 264/328.1; 29/899
[58] Field of Search .................................. 473/383, 384

[56] References Cited

U.S. PATENT DOCUMENTS 5,547,197  8/1996  Pocklington ........................ 473/384

*Primary Examiner*—George J. Marlo
*Attorney, Agent, or Firm*—Sughrue, Mion, Zinn, Macpeak & Seas, PLLC

[57] ABSTRACT

In a golf ball having at least a set of large and small diameter dimples, the large and small diameter dimples are of the same cross-sectional shape in their lower portion. The small diameter dimple (2) has the same shape in cross-sectional view from a depth of 0.01 mm below the dimple (2) edge (3) to the bottom as that of the bottom portion of the large diameter dimple (1). A master model is prepared by feeding a cutter into a hemispherical surface of a master block to different depths while rotating the cutter, thereby forming a set of large and small recesses, respectively, wherein the large and small recesses have the same cross-sectional shape. The master model having plural types of dimples can be briefly fabricated and has increased freedom of design. Using the master model, a golf ball featuring uniform and densely distributed dimples can be manufactured.

3 Claims, 7 Drawing Sheets

GOLF BALL

BACKGROUND OF THE INVENTION

1. Field of the Invention

This invention relates to a golf ball providing an increased carry. It also relates to a master model and a mold for use in the molding of such golf balls.

2. Prior Art

Golf balls are conventionally manufactured by molding. Normally a plurality of dimples are formed in golf balls for improving aerodynamics thereof. Then the golf ball-forming mold on the cavity surface thereof must be provided with a plurality of protrusions corresponding to the dimples.

Such a golf ball mold is often prepared by reversing a master model having recesses corresponding to the protrusions. The master model having recesses, in turn, is typically prepared by a method as shown in FIG. 7. There are furnished a metallic master block of hemispherical shape 11 and a cutter 12. While the cutter 12 is rotated about its axis, the cutter 12 is fed into the hemispherical surface of the master block 11 to a certain depth from a reference position, thereby machining a recess in the master block 11. With a fixed quantity of feed, recesses (or dimples) of the same diameter and depth are machined. Japanese Patent Application Kokai (JP-A) No. 55364/1994 discloses a method for forming recesses by electric discharge machining instead of a cutter.

When it is desired to provide a master model with plural types of recesses (dimples) having different diameter, depth and/or cross-sectional shape, the above-mentioned prior art methods for forming master models must use plural types of cutters. Cutters must be replaced many times before all types of recesses are formed. The frequent cutter replacement is cumbersome and adds to the cost. There is a demand for improvement in this respect.

For golf balls, there is always a demand for improving the aerodynamics, especially distance.

SUMMARY OF THE INVENTION

An object of the invention is to provide an improved golf ball providing a longer carry. Another object is to provide a master model for such an improved golf ball, which can be prepared in an efficient and cost effective manner while minimizing the frequency of cutter replacement. A further object is to provide a mold for use in the molding of such improved golf balls.

According to the invention, there is provided a golf ball having plural types of dimples including at least a set of large and small diameter dimples. In the set, the small diameter dimple has the same shape in cross-sectional view from a depth (d) of 0.01 mm below the dimple edge to the bottom as that of the bottom portion of the large diameter dimple. The set may include three types of dimples having different diameters, that is, large, medium, and small diameters and if desired, more than three types of dimples. Two or more different sets of dimples may be included. The provision of large and small diameter dimples having lower portions of the same cross-sectional shape improves the aerodynamics of a golf ball by reducing drag so that the ball will travel a longer distance.

According to the invention, a master model for use in the manufacture of such a golf ball is also provided. The master model is prepared by feeding a cutter into a hemispherical surface of a master block to different depths from a reference position while rotating the cutter, thereby forming a set of large and small recesses corresponding to the large and small diameter dimples, respectively. In the set, the cross-sectional shape of the small recess is the same as the cross-sectional shape of a bottom portion of the large recess. The set of recesses may include three types of recesses having different diameters, that is, large, medium, and small diameters and if desired, more than three types of recesses. Two or more different sets of recesses may be formed using two or more cutters. Since two or more types of recesses are machined in the master model using a single cutter as opposed to the fabrication of conventional master models, the frequency of replacement of cutters is reduced. More types of recesses can be machined using a smaller number of tools. The fabrication of a master model is simplified and accomplished at low cost.

A mold for forming golf balls is fabricated by reversing the master model using a silicone compound, for example.

BRIEF DESCRIPTION OF THE DRAWINGS

These and further features of the present invention will be apparent with reference to the following description and drawings, wherein.

DESCRIPTION OF PREFERRED EMBODIMENTS

According to the invention, a golf ball has plural types of dimples in its spherical surface. The dimples include at least a set of large and small diameter dimples. In the set, the small diameter dimple has the same shape in cross-sectional view from a depth (d) of 0.01 mm below the dimple edge to the bottom as that of the bottom portion of the large diameter dimple.

Figure 1:
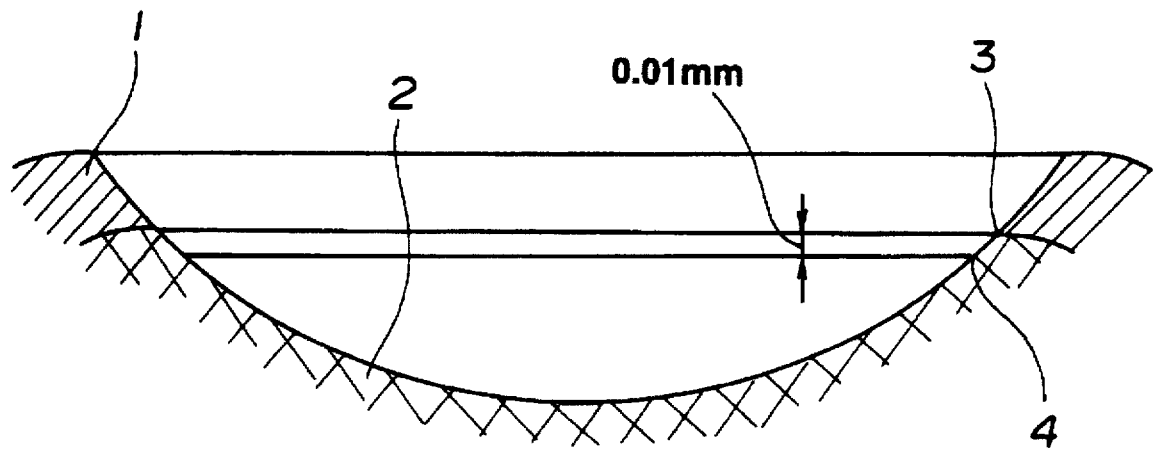
FIG. 1 schematically illustrates a large diameter dimple and a small diameter dimple in an overlapped manner.

Referring to FIG. 1, a large diameter dimple 1 and a small diameter dimple 2 are depicted in an overlapped manner. The large diameter dimple 1 has a peripheral edge and the small diameter dimple 2 has a peripheral edge 3, both as the boundary between the dimple and the spherical land. A phantom line 4 is depicted at a position inwardly or downwardly spaced a distance (d) 0.01 mm from the dimple edge 3 as measured in a radial direction with respect to the ball center. The cross-sectional shape of a lower portion of the small diameter dimple 2 which is disposed below the line 4 of 0.01 mm deep from the dimple edge 3 is the same as the cross-sectional shape of a bottom portion of the large diameter dimple 1. These lower portions are made similar for the reason that the golf ball is finally finished with paint. The dimpled ball surface is changed a little by paint coating in that the dimple edge is rounded or blunted. More specifically, the edge-adjoining thin portion of a dimple which is disposed above a depth of 0.01 mm from the edge is rounded by paint coating and therefore, that portion as paint coated does not faithfully reproduce the cavity's negative dimple pattern. It is noted that in the golf ball as molded and before paint coating, the cross-sectional shape of the entire small diameter dimple 2 is substantially the same as the cross-sectional shape of a bottom portion of the large diameter dimple 1. One set of large and small diameter dimples having the same bottom shape as mentioned above is sometimes referred to as a set of similar dimples.

It is understood that although only two large and small dimples are shown in FIG. 1, the number of dimples whose diameter is larger than the smallest diameter dimple and whose bottom portion has the same cross-sectional shape as the cross-sectional shape of the above-defined lower portion of the smallest diameter dimple is not limited to one and two or more such large diameter dimples may be included in the same set. Differently stated, the set of large and small diameter dimples satisfying the above-mentioned requirement includes two types of dimples in the illustrated embodiment although more than two types of dimples may be included in such a set. For example, the set includes three types of dimples having large, medium, and small diameters.

Also, the dimple set is not limited to one group. Dimples of two or more sets may be included. That is, in addition to a first set of similar dimples as shown in FIG. 1, the golf ball may bear a second set of similar dimples which are not similar to the first set dimples, but similar (overlapped) within the second set.

In the practice of the invention, the total number of dimples on the golf ball is not critical although it is preferably 320 to 500, especially 420 to 434. Also the planar shape of dimples is not critical although it is generally circular. Circular dimples having a diameter of 2 to 6 mm, preferably 2 to 4.4 mm and a depth of 0.1 to 0.3 mm, preferably 0.1 to 0.22 mm are preferred.

Figure 2:
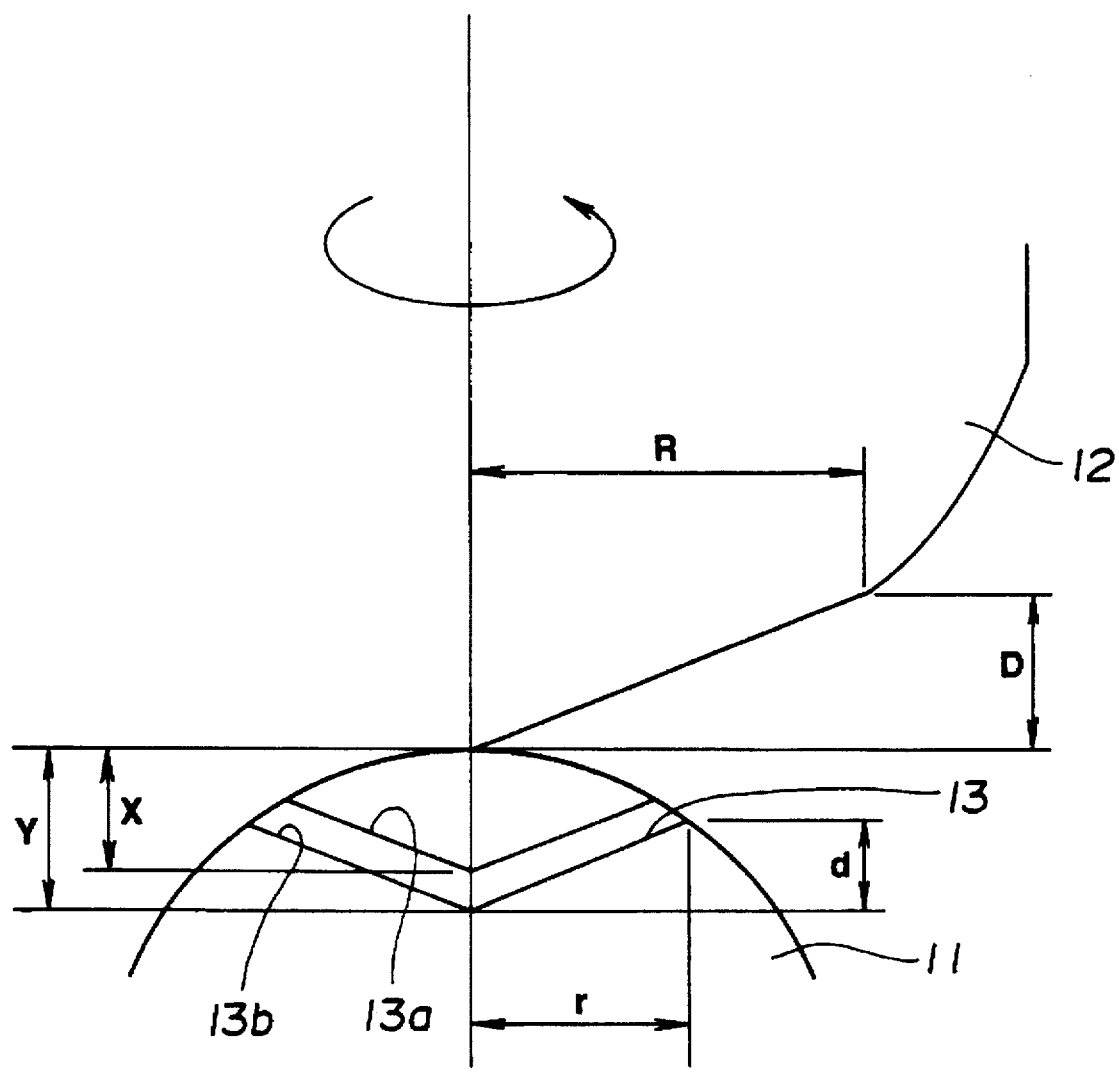
FIG. 2 schematically illustrates how to prepare a master model.

Golf balls having dimples as defined above are prepared using a master model. As shown in FIG. 2, the master model is prepared by feeding a cutter 12 into the hemispherical surface of a hemispherical metallic master block 11 while rotating the cutter 12 about its axis as shown by an arrow, thereby machining a recess 13 corresponding to a dimple. A small recess 13a corresponding to a small diameter dimple is formed by feeding the cutter 12 a short distance. A large recess 13b corresponding to a large diameter dimple is formed by feeding the cutter 12 a long distance. As a result, a master model is obtained having a set of small and large recesses 13a and 13b formed therein wherein the cross-sectional shape of the small recess 13a is the same as the cross-sectional shape of a bottom portion of the large recess 13b. More than two types of recesses having different diameters and depths may be formed as belonging to this similar recess set. Also, using two or more cutters having different cutting edge shapes, there can be formed two or more sets of similar recesses.

It is noted in FIG. 2 that the cutter 12 has a cutting edge which has a radius or width R at its upper end and a height D between the upper and lower ends. A recess machined in the master block 11 has a radius r and a depth d. A small diameter shallow recess 13a is formed by feeding the cutter 12 a short distance X as measured for the lower end of the cutting edge from the surface of the master block 11 which is a reference position. A large diameter deep recess 13b is formed by feeding the cutter 12 a long distance Y.

For simplicity's sake, a conical recess having an angular bottom at the center is illustrated in FIG. 2. It is understood that the recess (or dimple) preferably has a curvilinear cross-sectional contour such as semicircular, semi-ellipsoidal, sinusoidal and parabolic contours although a trapezoidal contour is also acceptable.

By reversing the master model mentioned above, a golf ball mold is prepared. Using the master model, a mold cavity having a negative pattern may be formed by conventional methods such as casting, electroforming and hobbing as disclosed in JP-A 84978/1992.

Figure 3:
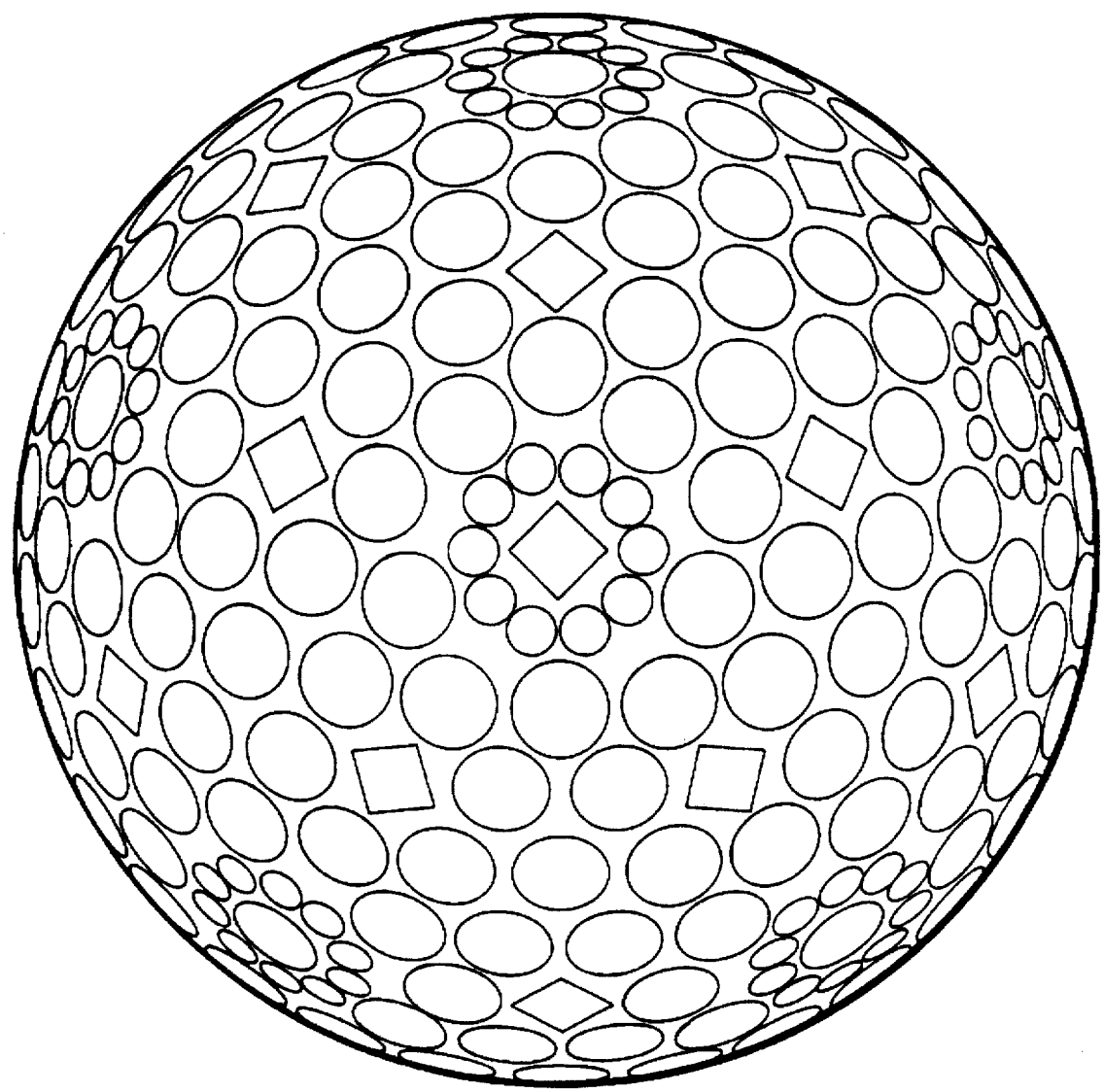
FIGS. 3 to 6 are elevational views of golf balls according to several preferred embodiments of the invention.
Figure 4:
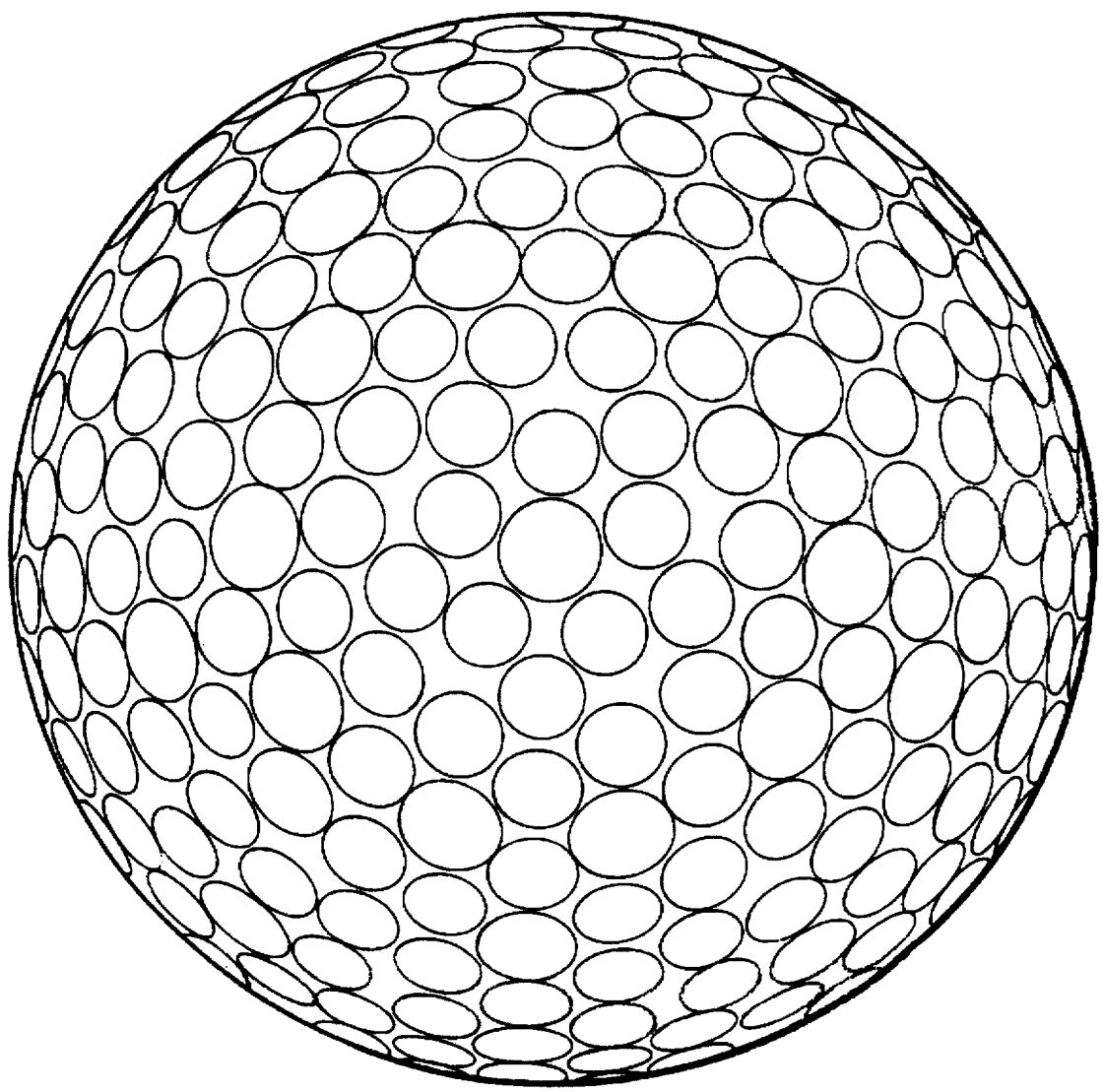
Figure 5:
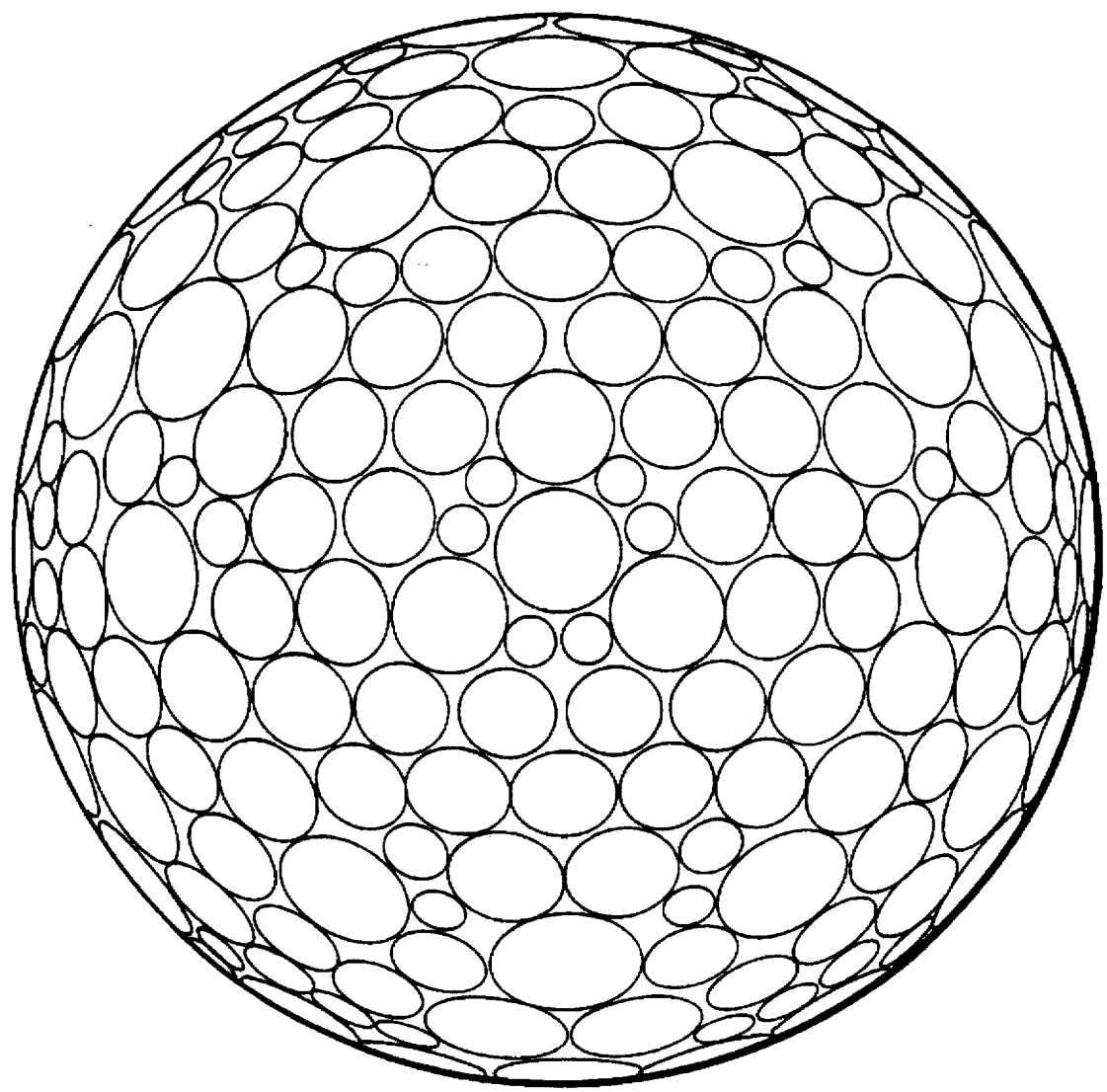

FIGS. 3 to 5 illustrate golf balls having exemplary dimple arrangements. The golf ball of FIG. 3 having 422 dimples is prepared by using a cutter having R=4 mm and D=0.4 mm, changing the feed of the cutter into a master block between two distances Y and X, thus machining the master block to form large circular recesses with r=2 mm and d=0.2 mm and small circular recesses with r=1 mm and d=0.1 mm, thereby obtaining a master model having such a set of large and small recesses. There is finally obtained a golf ball having large and small dimples corresponding to the large and small recesses, respectively.

It is seen from FIG. 3 that there may be contained dimples of rectangular shape in addition to dimples of circular shape. Such rectangular dimples can be formed in the master model by using an NC machine equipped with a cutter having a pointed edge and incising along the boundary of a dimple from inside the dimple.

The golf ball of FIG. 4 having 422 dimples is prepared by using two cutters, No. 1 cutter having R=4 mm and D=0.4 mm and No. 2 cutter having R=4 mm and D=0.44 mm. Using No. 1 cutter, large circular recesses with r=1.9 mm and d=0.19 mm and small circular recesses with r=1.8 mm and d=0.18 mm are formed. Using No. 2 cutter, large circular recesses with r=1.7 mm and d=0.187 mm and small circular recesses with r=1.6 mm and d=0.176 mm are formed. This results in a master model having such two sets of large and small recesses. There is finally obtained a golf ball having a first set of two large and small dimples and a second set of two large and small dimples.

The golf ball of FIG. 5 having 434 dimples is prepared by using a single cutter and arranging one, three or six recesses at the same latitude on the spherical surface of a master block, thereby producing a master model with 34 types of recesses as a whole. There is finally obtained a golf ball having largest dimples with r=3 mm and d=0.3 mm and smallest dimples with r=1 mm and d=0.1 mm.

Two two-piece golf balls A and B were manufactured by preparing two master models A and B having the same arrangement and number of dimples, but different in dimple diameter and depth, forming reverse molds of silicone compound therefrom, and molding stock material in the molds.

EXAMPLE

Master Model A (a) Circular dimples with r=1.86 mm and d=0.213 mm were formed using No. 4 cutter with R=2.2 mm and D=0.300 mm.

(b) Circular dimples with r=1.86 mm and d=0.192 mm were formed using No. 6 cutter with R=2.2 mm and D=0.270 mm.

(c) Circular dimples with r=1.75 mm and d=0.189 mm were formed using No. 4 cutter with R=2.2 mm and D=0.300 mm.

(d) Circular dimples with r=1.75 mm and d=0.207 mm were formed using No. 5 cutter with R=2.2 mm and D=0.330 mm.

(e) Circular dimples with r=1.66 mm and d=0.186 mm were formed using No. 5 cutter with R=2.2 mm and D=0.330 mm.

COMPARATIVE EXAMPLE

Master Model B (a') circular dimples with r=1.85 mm and d=0.210 mm
(b') circular dimples with r=1.85 mm and d=0.190 mm (c') circular dimples with r=1.75 mm and d=0.190 mm (d') circular dimples with r=1.75 mm and d=0.210 mm (e') circular dimples with r=1.65 mm and d=0.190 mm For each dimple, a cutter (R=r mm, D=d mm) corresponding to the dimple size was used. In any combination of (a') to (e'), dimple bottom portions were not of the same shape.

Working Time

The working time taken in fabricating master models A and B are shown in Table 1.

TABLE 1

|  | Working time | Number of cutters used |
|---|---|---|
| Invention, Model A | 4 hr./cutter | 3 cutters |
| Comparison, Model B | 6 hr./cutter | 5 cutters |

It is evident that the working time taken in fabricating master model A according to the invention is substantially short, which is advantageous when a number of master models must be fabricated and when a golf ball has many types of dimples.

Flight test

Figure 6:
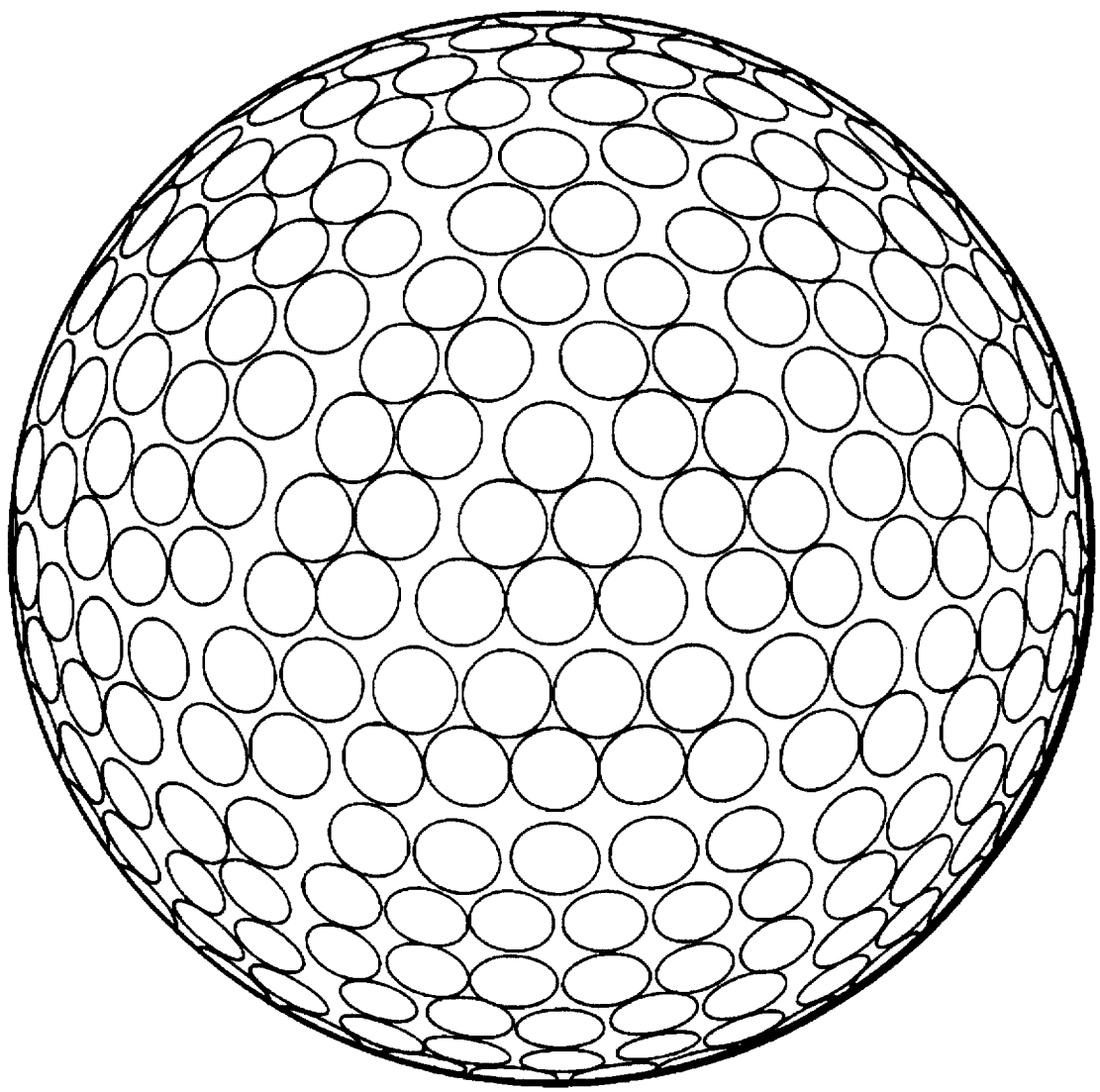
Figure 7:
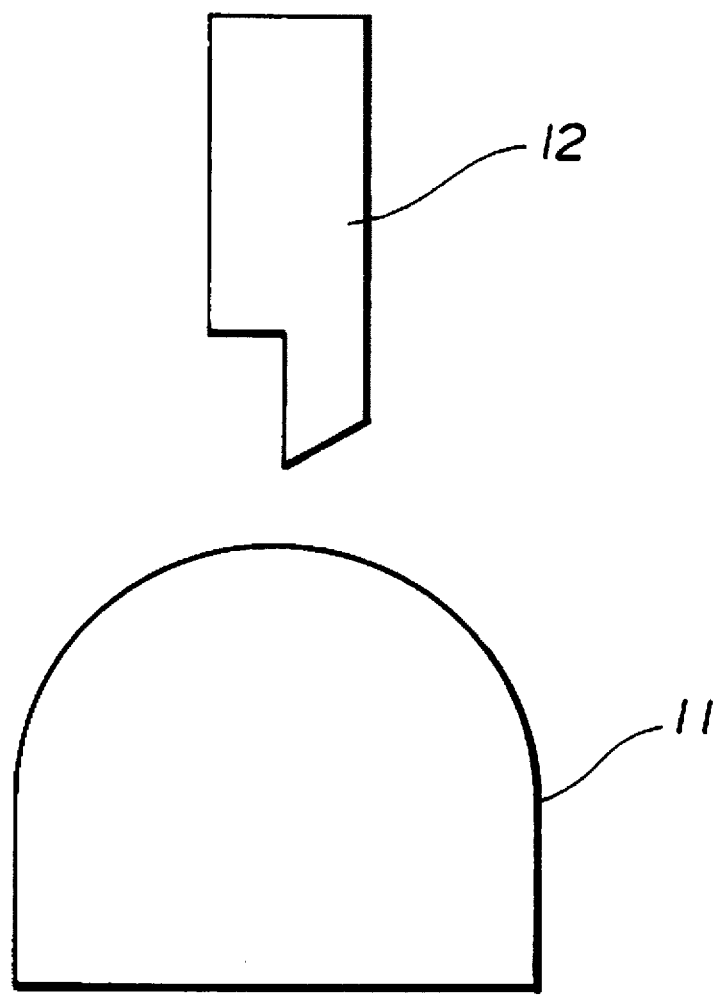
FIG. 7 schematically illustrates a prior art technique for machining a master model.

Two-piece golf balls A and B (having 420 dimples arranged as shown in FIG. 6) were manufactured using master models A and B. Using a swing robot, golf balls A and B were repeatedly hit in pole and seam hitting modes at a head speed of 45 m/sec. (Test 1) and a head speed of 40 m/sec. (Test 2) to measure a carry and a total distance. From the results of pole and seam hitting, symmetry was determined for evaluating flight performance. The results are shown in Table 2.

TABLE 2

|  | Invention Ball A | Comparison Ball B |
|---|---|---|
| Test 1 |  |  |
| Carry (average) | 210.9 m | 208.8 m |
| Total distance (average) | 223.9 m | 223.1 m |
| Difference between pole and seam hitting |  |  |
| Carry | +1.3 | +2.4 |
| Total distance | +0.8 | +1.2 |

TABLE 2-continued

|  | Invention Ball A | Comparison Ball B |
|---|---|---|
| Test 2 |  |  |
| carry (average) | 183.3 m | 182.4 m |
| Total distance (average) | 197.0 m | 195.2 m |
| Difference between pole and seam hitting |  |  |
| Carry | +0.7 | +1.9 |
| Total distance | -0.2 | +1.8 |

As compared with golf ball B, golf ball A according to the invention is improved in symmetry as demonstrated by the difference between pole and seam hitting because of the similarity of dimple bottom shape. Golf ball A is also increased in travel distance.

In the context of the invention, the same dimples (or recesses) mean that dimples (or recesses) may have a diameter tolerance within about 0.02 mm, a depth tolerance within about 0.005 mm, and a volume tolerance within about 1% with respect to a reference dimple.

According to the invention, a master model having plural types of recesses or dimples can be fabricated in a reduced length of time and has increased freedom of design. Using the master model, a golf ball featuring densely distributed uniform dimples can be manufactured.

Although some preferred embodiments have been described, many modifications and variations may be made thereto in the light of the above teachings. It is therefore to be understood that within the scope of the appended claims, the invention may be practiced otherwise than as specifically described.

We claim:

1. A golf ball having plural types of dimples including at least a set of large and small diameter dimples, wherein the small diameter dimple has the same shape in cross-sectional view from a depth of 0.01 mm below the dimple edge to the bottom as that of the bottom portion of the large diameter dimple.

2. The golf ball of claim 1 wherein said set includes at least three types of dimples having different diameters.

3. The golf ball of claim 1 wherein at least two different sets of dimples are included.

* * * * *